No. 704,227. Patented July 8, 1902.
H. WITTE.
RATCHET BRAKE FOR CARS.
(Application filed July 3, 1901.)
(No Model.)
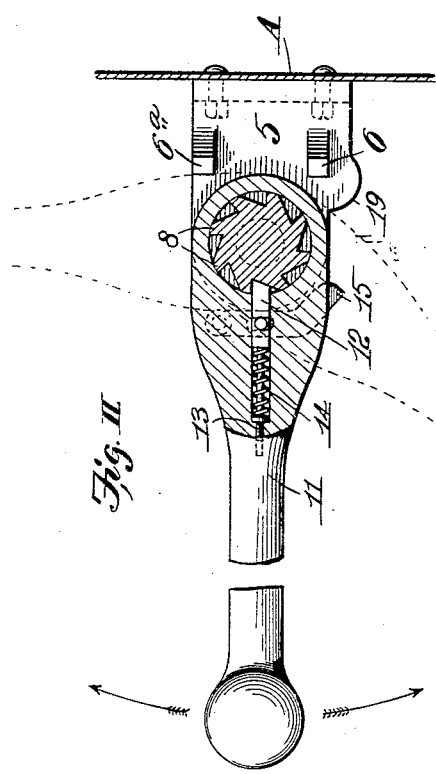
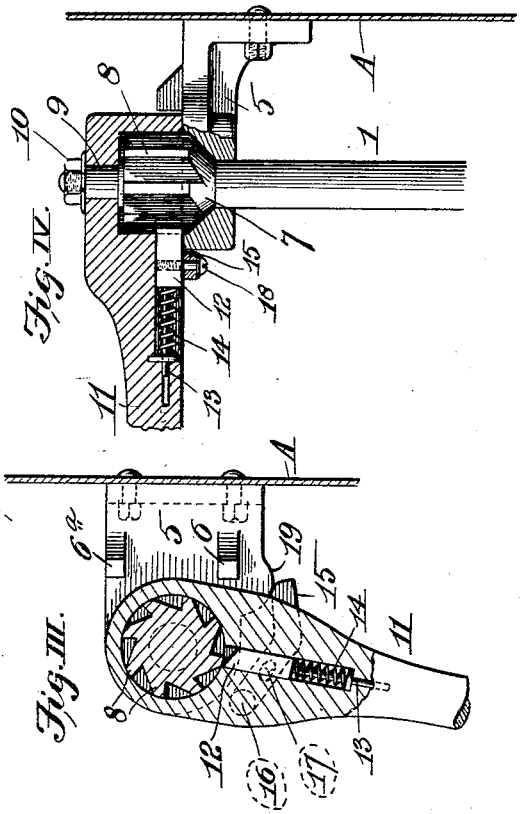
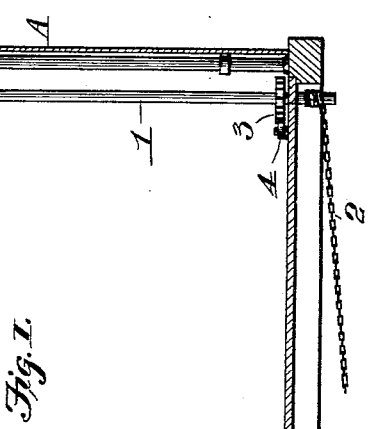
Attest:
G. A. Pennington
M. P. Smith
Inventor:
Hubert Witte.
by Wright Bro
Attys.

UNITED STATES PATENT OFFICE.

HUBERT WITTE, OF ST. LOUIS, MISSOURI, ASSIGNOR TO ST. LOUIS CAR COMPANY, OF ST. LOUIS, MISSOURI, A CORPORATION.

RATCHET-BRAKE FOR CARS.

SPECIFICATION forming part of Letters Patent No. 704,227, dated July 8, 1902.

Application filed July 3, 1901. Serial No. 66,965. (No model.)

*To all whom it may concern:*

Be it known that I, HUBERT WITTE, a citizen of the United States, residing in the city of St. Louis, in the State of Missouri, have invented certain new and useful Improvements in Ratchet-Brakes for Cars, of which the following is a full, clear, and exact description, reference being had to the accompanying drawings, forming part of this specification.

My invention relates to that class of street-car brakes wherein the brake-staff is provided with a series of ratchet-teeth and the brake-handle is equipped with a pawl adapted to engage said ratchet-teeth.

The invention consists in features of novelty hereinafter fully described, and pointed out in the claims.

Figure I is a view in side elevation of a brake constructed in accordance with my invention. Fig. II is a view partly in plan and partly in horizontal section. Fig. III is a view similar to Fig. II, showing the brake-handle moved into the position in which the pawl is disengaged from the ratchet-teeth. Fig. IV is a view of the brake, partly in elevation and partly in vertical section.

1 designates the staff to which the brake-chain 2 is connected, the staff being provided with the usual ratchet-wheel 3, that is engaged by the pawl 4, which serves to retain the staff in a set position.

5 designates a bracket secured to the dash A of a car. On the upper side of the bracket 5 is a pair of stops 6 and $6^a$.

7 designates a head at the upper end of the staff 1, seated in the bracket 5 and rigid with said staff. The head 7 is provided with a series of ratchet-teeth 8. Extending upwardly from the head 7 is a stem 9, that receives a nut 10.

11 designates the brake-handle, which is recessed at its inner end to fit over the staff-head 7 and through which the stem 9 passes for the attachment of the handle to the staff.

12 designates a pawl slidably mounted in the brake-handle 11 and adapted for engagement with the ratchet-teeth 8. The pawl 12 has attached to it the guide-rod 13, that is surrounded by a spring 14, that serves to hold the pawl normally projected into engagement with the ratchet-teeth 8, as seen in Fig. II.

15 designates a dog pivoted to the brake-handle 11 at 16 and provided with pivotal connection to the pawl 12 by a screw or pin 18, that is adapted to play in a slot 17, contained by the dog. The free end of the dog 15 is arranged to project beyond the side of the brake-handle, as seen in Figs. II and III.

19 designates a boss or projection extending from the bracket 5, at one side thereof, in a position adapted to receive the free end of the dog 15 when said dog is moved thereto.

In the practical use of the brake the handle 11 is rocked first in one direction and then in the other, its movement being limited by the stops 6 $6^a$ as it is brought into engagement therewith. As the handle is moved to the left, as seen in Fig. II, the pawl 12 is held in engagement with the ratchet-teeth 8 by the spring 14 and the head 7 and staff 1 are rotated in a corresponding direction to wind the chain 2 on the staff, and the staff is held from retrograde rotation by the ratchet-wheel and pawl 3 4. When the handle has been moved to the limit of its travel to the right, it strikes against the stop $6^a$ on the bracket 5 and the movement of the handle is reversed by the operator. The reverse movement of the handle is continued until the handle strikes the stop 6, the pawl 12 sliding over the ratchet-teeth being designed to engage said teeth on movement of the handle again to the right if the staff has not been sufficiently turned to set the brakes. On the movement of the brake-handle to the left the dog 15 strikes against the boss 19 and causes said dog to move outwardly into the position seen in Fig. III, and thereby retracting the pawl 12 from engagement with the ratchet-teeth 8 and freeing the head 7 from restraint, so that upon the release of the pawl 4 from the ratchet-wheel 3 the staff 1 is permitted to rotate in a reverse direction from that in which it was rotated to wind the chain 2 thereon and the chain is slackened to release the brake-shoes from contact with the car-wheels.

I claim as my invention—

1. The combination with a brake-staff, and a ratchet-head, of a bracket having a projection, a handle, a pawl secured to the handle, and a dog pivoted to the handle at one side of the pawl, connected to the pawl and extending over the same to engage with the projection on the bracket.

2. The combination with a brake-staff and a ratchet-head, of a bracket having a projection, a handle, a spring-pressed pawl sliding longitudinally within the handle and having a pin, and a dog provided with a slot in which the pin on the pawl works, pivoted to the handle at one side of the pawl, and extending over the same to engage with the projection on the bracket.

HUBERT WITTE.

In presence of—
 E. S. KNIGHT,
 M. P. SMITH.